May 17, 1932. J. A. E. CARLSON 1,858,618
POWER DRIVEN MOWER
Filed May 17, 1926  4 Sheets-Sheet 2
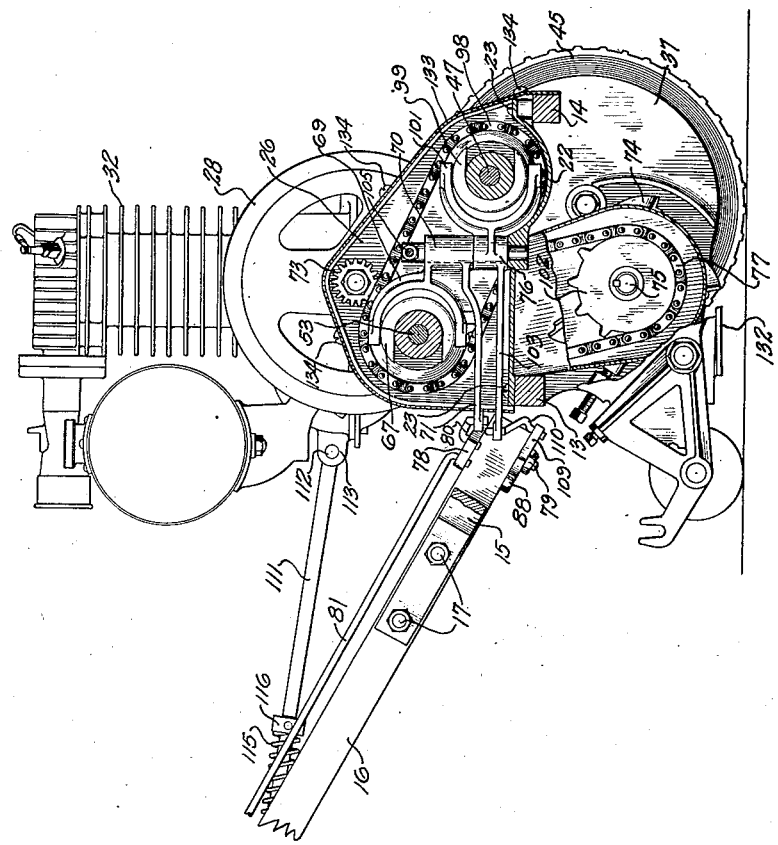
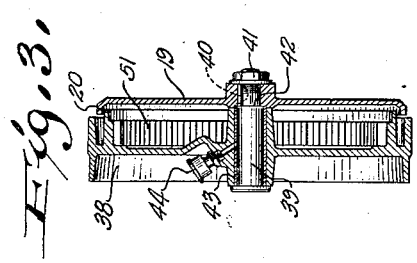
INVENTOR.
John A. E. Carlson
BY
ATTORNEYS

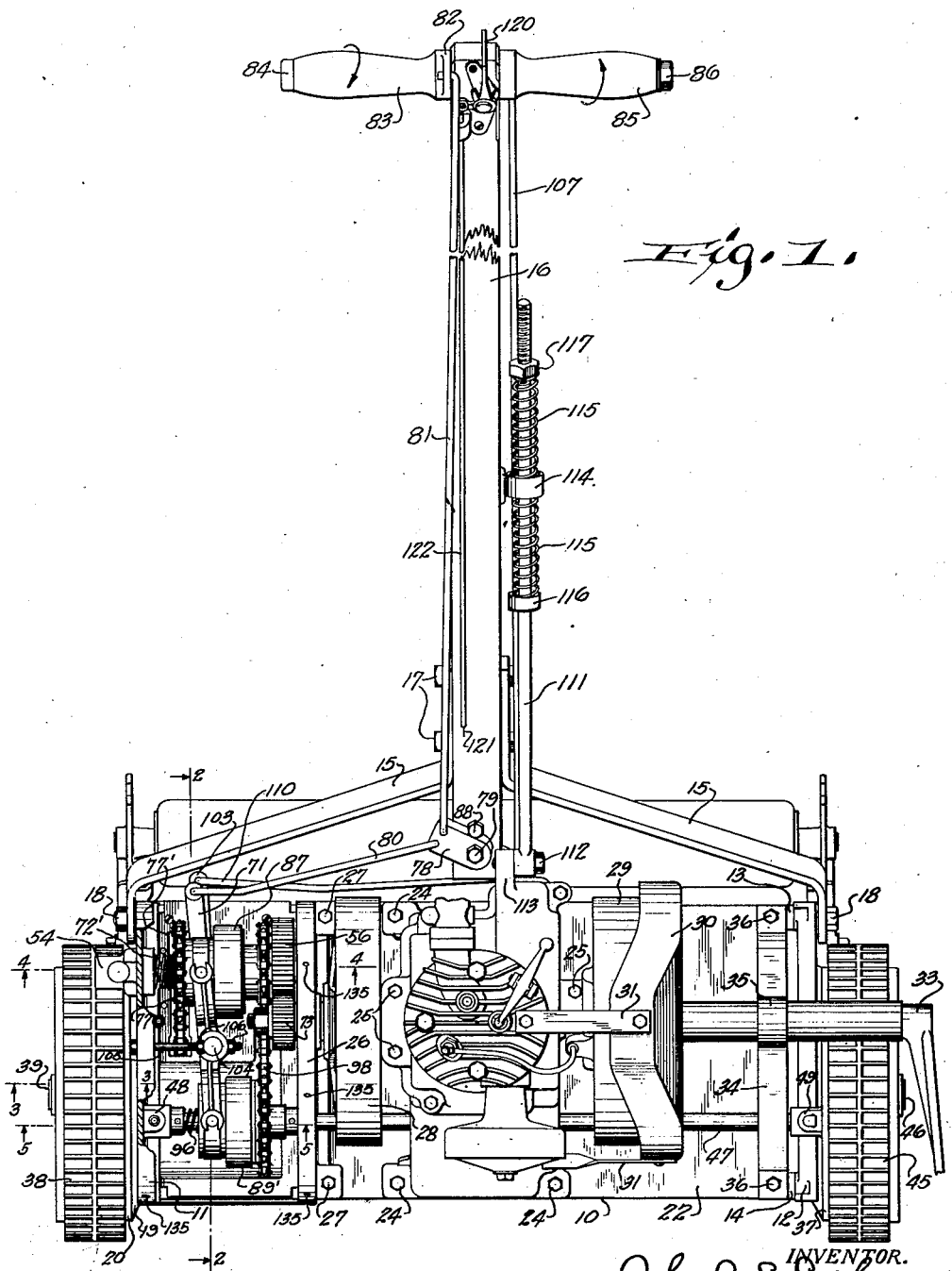

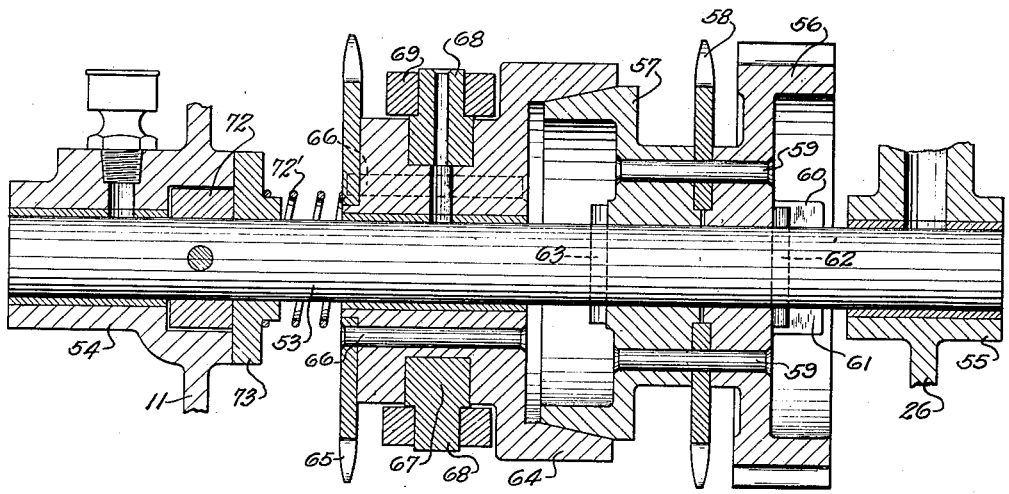
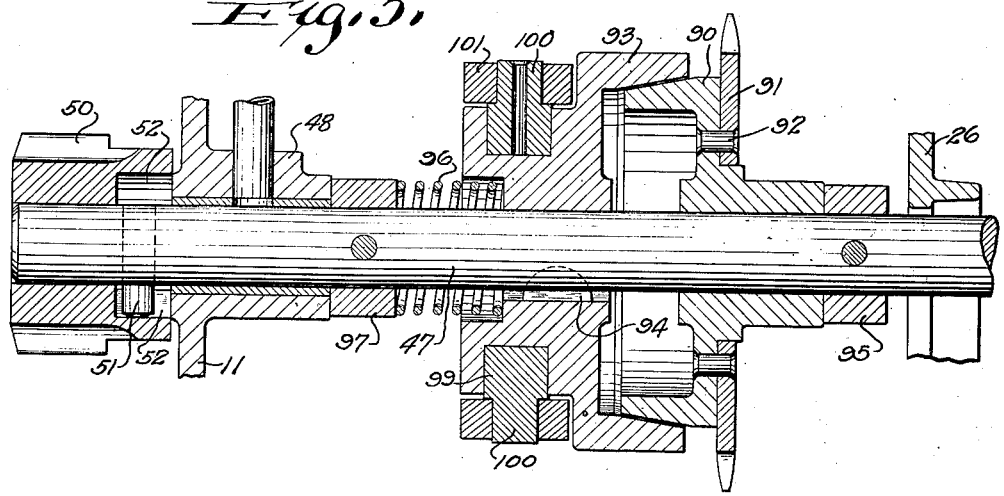

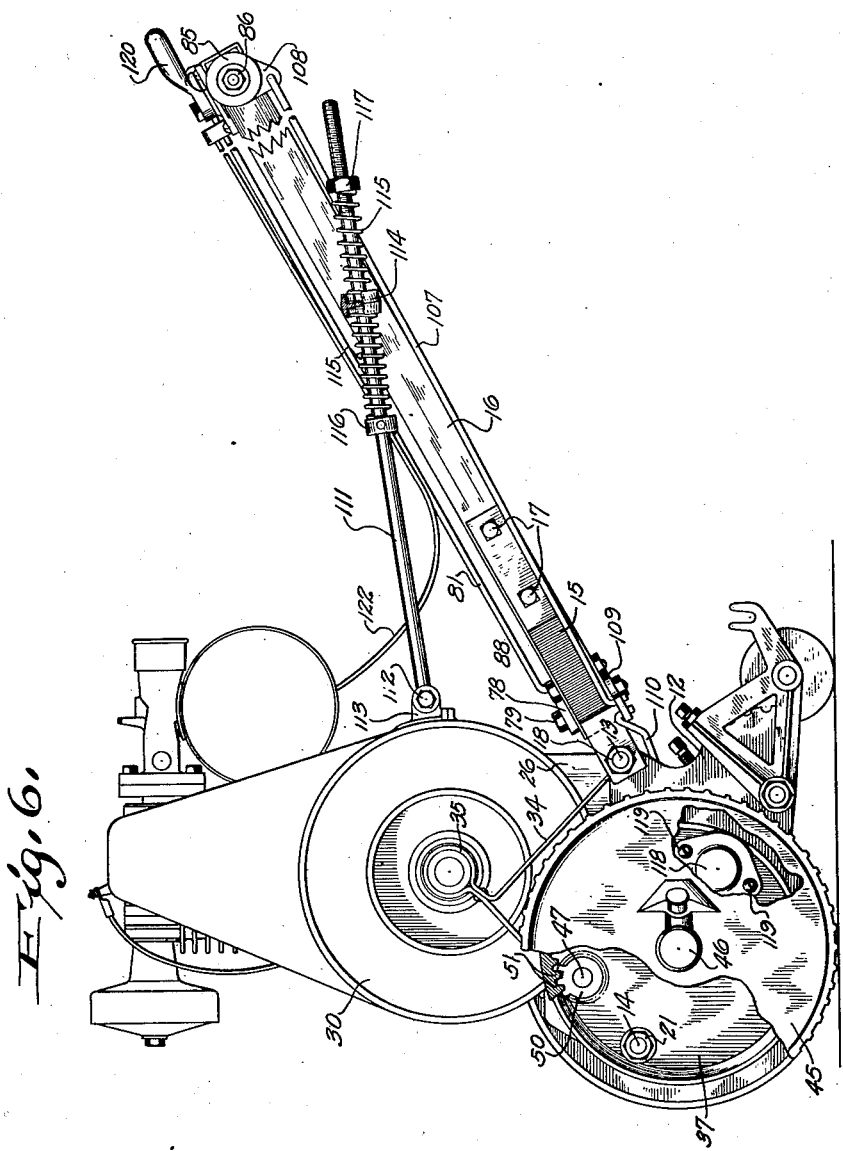

Patented May 17, 1932

1,858,618

UNITED STATES PATENT OFFICE

JOHN A. E. CARLSON, OF RACINE, WISCONSIN, ASSIGNOR TO JACOBSEN MANUFACTURING CO., OF RACINE, WISCONSIN, A CORPORATION OF WISCONSIN

POWER DRIVEN MOWER

Application filed May 17, 1926. Serial No. 109,491.

This invention relates to improvements in power driven mowers such as are used for cutting lawns.

One of the objects of the present invention is to provide, in a mower of the character referred to, an improved construction of the transmission and controlling mechanism between the driving motor and the traction wheels and the cutting reel which has advantages over such mechanism constructed heretofore as regards compactness and simplicity of construction and manner of operation, and wherein the traction wheels and the cutting reel may be readily and quickly connected and disconnected to and from the motor.

Another object is to provide, in a power motor, improved means for operating the clutches.

Other objects and advantages will hereinafter appear.

For the purpose of illustrating the invention, one embodiment of the invention is shown in the drawings, in which:

Figure 1 is a plan view of a lawn mower embodying the present improvements, the view being partly in section and partly broken away and some of the parts being removed for the sake of clearness;

Fig. 2 is an elevational view, partly in section and partly broken away, and looking toward the right in Fig. 1, the section being taken on the line 2—2 in Fig. 1;

Fig. 3 is a sectional view, taken on the line 3—3 in Fig. 1;

Fig. 4 is an enlarged sectional view, taken on the line 4—4 in Fig. 1;

Fig. 5 is an enlarged sectional view, taken on the line 5—5 in Fig. 1;

Fig. 6 is an elevational view, partly in section and partly broken away, looking toward the left in Fig. 1, some of the parts being removed for the sake of clearness.

The frame of the mower, designated generally by the reference numeral 10, includes the end frame members 11 and 12 and the transversely arranged cross pieces 13 and 14 having their respective ends rounded and extended through members 11 and 12. The ends of the cross piece 13 also pass through the lower ends of the braces 15 to which the guiding handle 16 is fixed by means of the bolts 17, these ends of cross piece 13 being threaded to receive nuts 18 for holding the parts in assembled relation.

The ends of cross piece 14 are also rounded and threaded, one of these ends passing through the front end frame member 12, the other end of this piece extending through the front end of frame member 11 and a circular plate 19 provided with an outwardly extending flange 20 for the purpose hereinafter explained, the threaded ends of cross piece 14 receiving nuts 21 for holding the various parts in assembled relation. A base plate 22 extends across the transverse pieces 13 and 14 between end frame members 11 and 12 and is secured to the former by means of screws 23. A suitable gasoline engine is arranged centrally of frame 10 and fixed thereto by means of bolts 24 and 25, bolts 25 extending through base plate 22 and bolts 24 extending through the base plate and cross pieces 13 and 14. A third frame member 26, similar in construction to frame members 11 and 12, is arranged therebetween and secured to base plate 22 and cross pieces 13 and 14 by means of bolts 27. Suitable flywheels 28 and 29 are fixed upon the crank shaft of the engine on either side thereof, a suitable guard 30 being placed over flywheel 29 and supported by suitable braces 31 fixed thereto and to the engine, the latter being indicated generally in Fig. 2 by the reference numeral 32. For the purpose of supporting and guiding the starting crank 33 for the engine, a strap 34 is bent to provide a ring or bearing portion 35 for receiving the starting crank and arranged in alignment with the engine crank shaft, the ends of strap 34 being fixed to cross pieces 13 and 14 by bolts 36. When the engine has been started, the starting crank 33 is removed. A circular plate 37, similar in construction to plate 19, is provided at the end of frame 10 opposite the latter, the adjacent threaded end of cross piece 14 extending through plate 37 and receiving the nut 21, shown in Fig. 6, for holding this plate and frame member 12 in assembled relation.

The supporting traction wheel 38 may be of any suitable construction and is loosely mounted on a stub shaft 39 provided with a reduced threaded end extending through plate 19 and fixed thereto by means of the key 40 and nut 41, the latter being screwed tight to bring the shoulder 42 into tight engagement with the outer face of plate 19. The stub shaft 39 is thereby fixed rigidly in plate 19 against rotary movement, a suitable bushing 43 being interposed between the hub of wheel 38 and the stub shaft. A grease cup 44 may be screwed into the hub of wheel 38. as more clearly shown in Fig. 3, to supply lubricant to shaft 39. The supporting traction wheel 45 is identical in construction to wheel 38 and is loosely mounted on the stub shaft 46, the latter being similar in construction to stub shaft 39 and fixed to plate 37 in the same manner as shaft 39 is fixed to plate 19.

For the purpose of driving wheels 38 and 45, a drive shaft 47 is arranged transversely of the mower and journaled at its ends in suitable bearings 48 and 49 formed integrally with the end frame members 11 and 12, respectively. The ends of drive shaft 47 extend beyond these frame members and carry pinions 50 which mesh with internal peripheral teeth 51 with which each of the wheels 38 and 45 is provided, shaft 47 extending loosely through the intermediate frame member 26, as more clearly shown in Fig. 5. The usual sliding pin clutch is employed for connecting pinions 50 to shaft 47 for rotation therewith in one direction only, this direction corresponding to the rotation of shaft 47 in a counter-clockwise direction, as viewed in Fig. 6, to drive the machine forward. The sliding pin clutch permits of relative rotary movement in the opposite direction between drive shaft 47 and pinions 50 to permit of a greater rate of rotation of one wheel over that of the other in negotiating a turn. As indicated in Fig. 5, this sliding pin clutch comprises a pin 51' extending loosely through each end of shaft 47, and the internal ratchet teeth 52 with which each pinion 50 is provided, the ends of each pin 50 engaging the front of one of the teeth 52 in driving the machine straight ahead, and the sloping faces of the teeth engaging the ends of the corresponding pin when one of the wheels 38 or 45 rotates at a greater rate than the other in making a turn. A shaft 53 is arranged in spaced parallel relation with respect to drive shaft 47 and is journaled at its ends in bearings 54 and 55 which may be cast integrally with the frame members 11 and 26, respectively, bearings 54 and 55 permitting of slight axial shifting of shaft 53 for the purpose hereinafter explained. A gear 56, a male clutch member 57 and a sprocket wheel 58 interposed therebetween are secured together by rivets 59, these parts being mounted on shaft 53, as shown. Gear 56 is provided with a boss 60 having a slot 61 extending centrally therethrough to receive the ends of a pin 62 extending through shaft 53 and having a tight fit therein, pin 62 thereby locking shaft 53 to the unit comprising gear 56, clutch member 57 and sprocket wheel 58 for rotation therewith. A second pin 63 is passed through shaft 53 and acts to hold this unit in its extreme position to the right on shaft 53 as determined by the position of pin 62. A female clutch member 64 is loosely mounted on shaft 53 and is provided with a sprocket wheel 65 fixed thereto by means of rivets 66. A collar 72 is fixed on shaft 53 and fits loosely in a recess formed in the adjacent face of frame member 11, a spring 72' being arranged on shaft 53 between a second collar 73' loosely mounted on the shaft and the female clutch member 64, spring 72' acting at all times to urge clutch member 64 into driving engagement with clutch member 57. The end of the engine crank shaft adjacent frame member 26 is extended through and beyond the latter and carries a gear 73 meshing with gear 56 whereby shaft 53 is connected directly to the engine or motor 32.

The usual cutting reel or element 74 is fixed on the reel shaft 75 having its ends journaled in suitable bearings which may be cast integrally with the end frame members 11 and 12. As shown in Figure 2, a sprocket wheel 76 is fixed on the reel shaft and is connected to the sprocket wheel 65 on the main transmission shaft 53 by a sprocket chain 77. Since the reel shaft is beneath the base plate 22 and the transmission shaft 53 is above the plate, the chain 77 must pass through the plate. Accordingly, a slot 77' (Figure 1) is provided in the plate.

It will thus be seen that motion of the cutting reel is controlled by the clutch 87 (Figure 1) this clutch being the one shown in detail in Figure 4. The operation of this clutch will now be described. With the parts in the position shown in Figure 4, the clutch is maintained in engaging position by the spring 72' which bears directly upon the female member 64 to exert a pressure thereon to the right and which also bears upon the male member 57 through the loose collar 73', the fixed collar 72, the shaft 53 and the pin 62. In this position the force of the spring is not exerted upon the bearing face of the frame member 11, since the collar 73' and the clutch member 64 are held in position by elements 57 and 72 fixed to the shaft 53. Since the collars 72 and 73' are then revolving together no wearing is produced by the friction therebetween.

When the clutch is moved to disengaged position, however, the shaft 53 and collar 72 will continue to rotate while the clutch member 64 and collar 73' come to rest. Unless the friction between the collars 72 and 73' is relieved, these parts will soon wear out. Accordingly an actuating means for the clutch provides an arrangement for shifting the spring pressure on the collar 73' from the collar 72 to a bearing portion of a frame 11 so that the force of the spring is always exerted upon relatively immovable parts when the clutch is in either engaged or disengaged positions.

The means for actuating the clutch and for accomplishing the above described function of shifting the pressure of the spring will now be described. The hub of the loosely mounted clutch member 64 is provided with an annular groove for receiving a U-shaped collar 67, which is provided with diametrically opposite outwardly extending lugs 68. A yoke 69 is fitted upon the lugs 68 and is provided with an operating arm 71 and with a bearing portion 70 for pivotally mounting it in position on a pin 104. The pin 104 is fixed with respect to the frame member 11, its lower end being secured to the base plate 22 and its upper end being braced by a bolt 105 which is anchored in the frame member 11 and is clamped to the pin by nuts 106. The pin 104 also supports a second yoke 101 on a bearing 102 for actuating different clutch mechanisms which will be described hereinafter.

For the purpose of operating the clutch actuating member or yoke 69 through the arm 71, a member 78 is pivotally mounted on a bolt 79 extending through the lower end of handle 16, and is connected to the outer end of arm 71 by means of a rod 80. A rod 81 is also connected to member 78 and to a lug 82 formed integrally with a hand grip 83 loosely mounted on a bolt 84 extending loosely therethrough and through the upper end of handle 16, as well as through a second oppositely-directed hand grip 85, a nut 86 being threaded on the end of bolt 84 to hold these parts in assembled relation while permitting free rotary movement of the hand grips 83 and 85. It will thus be seen that the clutch just described, designated generally in Fig. 1 by reference numeral 87, is connected to the manually-operable means or hand grip 83 by the connecting means comprising member 78 and rods 80 and 81, and that this connecting means has a dead-center position when member 78 and rod 80 are in alignment with each other. As shown in Fig. 1, the member 78 is slightly above its dead-center position and rests against a stop provided by the bolt 88 extending through the lower end of handle 16, in which position of member 78 and its associated parts, clutch 87 is disengaged, spring 72' tending to apply the clutch but serving only to hold member 78 against the stop 88 at this time. Upon rotation of hand grip 83 in the direction of the arrow in Fig. 1, rod 81 moves member 78 downwardly until the same passes on the other side of or below its dead-center position, at which time spring 72' is free to and does move clutch member 64 into engaging or driving relation with clutch member 57.

Thus when the clutch is held disengaged by the yoke 69 the pressure of the spring 72' is shifted from the members fixed to shaft 53 to the frame, the pressure from the right end of the spring (Figure 4) being transmitted to the frame through the clutch member 64, yoke 69 and pin 104 while the pressure from the left end of the spring is transmitted to the frame through the collar 73' which abuts against a bearing face on the frame member 11. The above described shifting of the spring pressure takes place without appreciable lateral movement of the shaft, although there is, of course, enough movement to permit the complementary surfaces of the collars 72 and 73' to separate slightly and to permit the complementary surfaces of the collar 73' and member 11 to come in contact as the clutch is disengaged.

For controlling the operation of the traction means, a second clutch indicated generally in Figure 1 by the reference numeral 89 and which is somewhat similar in construction to the clutch 87, is carried by the traction drive shaft 47. Clutch 89 comprises a male member 90 provided with a sprocket wheel 91 fixed thereto by rivets 92 and a female member 93 splined on shaft 47 by means of a Woodruff key 94, member 90 being loose on shaft 47 and limited against movement along the same to the right by means of a fixed collar 95. A spring 96 is arranged on shaft 47 between a collar 97 fixed thereon and the female clutch member 93, this spring acting to urge the latter into driving engagement with member 90. A sprocket chain 98 is arranged about sprocket wheels 58 and 91, and provides a driving connection between shafts 53 and 47. A U-shape collar 99, similar to collar 67, fits loosely in an annular groove in clutch member 93, and is provided with lugs 100 which fit loosely in the ends of the yoke or clutch actuating member 101, the latter being provided with the bearing portion 102 and the arm 103. It will be noted that the clutch 89 and shaft 47 differ in their construction and operation from the clutch 87 and shaft 53 in that the shaft 47 is connected to the female member 93 and comes to rest when the clutch is disengaged whereas in the clutch 87 the shaft keeps on turning irrespective of the position of the clutch. Because of this difference in the clutching means the abutment for the clutch actuating spring may be somewhat simplified. Since it is not necessary to provide a spring abutment which may be moved relative to the shaft, the collar 97 fixed to the shaft 47 serves the functions of both collars 72 and 73' of the above described clutch actuating mechanism. Thus, with the clutch in the position shown in Figure 5, the pressure of the spring 96 is transmitted through the shaft 47 to the clutch members to force the same together. When the yoke 101 is operated to move the clutch to disengaging position, however, the shaft 47 and collar 97 are moved slightly to bring the complementary surface of the frame member 11 and the collar 97 into engagement and the pressure of the spring is shifted to the frame 11 as in the arrangement of Figure 4. The operating arm 103 of the yoke 101 is connected to hand grip 85 for actuation thereby by means of the rod 107 connected to the lug 108 formed integrally with this hand grip, and to the member 109, the latter being similar in construction to member 78 and pivotally mounted on bolt 79, member 109, however, being arranged on the underside of handle 16, as more clearly shown in Figs. 2 and 6. A rod 110 provides a connection between member 109 and the outer end of arm 103. The arrangement and manner of operation of member 109 is identical to that of member 78, member 109 having a dead-center position which is reached when clutch 89 is disengaged, member 109 at this time resting against the lower end of bolt 88 which provides a stop therefor, spring 96 acting to hold member 109 against this stop. Upon rotation of hand grip 85 in the direction of the arrow shown in Fig. 1, rod 107 will force member 109 downwardly below its deadcenter position, at which time spring 96 will be free to act to move the female clutch member 93 into driving engagement with the male clutch member 90. It will thus be seen that members 78 and 109 rest against the stop provided by bolt 88 when the associated clutches 87 and 89 are disengaged, and that these clutches are readily applied by the respective springs 72' and 96 upon slight rotary movement of the hand grips 83 and 85 in the directions indicated by the arrows in Fig. 1 to move member 78 and 109 downwardly on the other side of their respective dead-center positions.

It will thus be seen that when the hand grips 83 and 85 are in the positions shown in Figure 1 the members 78 and 109 are slightly to one side of their dead center positions and are held against the stop bolt 88 under the action of springs 72' and 96 so that the clutches 87 and 89 are disengaged and the traction wheels and cutting reels are disconnected from the motor. Upon slight rotary movement of the hand grips in the direction shown by the arrows in Figure 1 members 78 and 109 will be forced downwardly about bolt 79 as a center to the other side of their respective dead center positions to permit engagement of the clutches 87 and 89 under the action of their springs 72' and 96. The clutch 87 thus acts to connect the cutting reel 74 to the motor and the clutch 89 acts to connect the traction wheels 38 and 45 to the motor. The hand grips 83 and 85 are independently operable to provide independent operation of the clutches 87 and 89.

A rod 111 is pivotally connected by means of a bolt 112 to a lug 113 which may be cast integrally with the cylinder casting, the rod extending loosely through a lug 114 fixed to handle 16. Springs 115 are arranged on rod 111 on either side of lug 114, a collar 116 being fixed on the rod and a nut 117 being threaded on the end thereof to engage the outer or remote ends of these springs to cause compression thereof upon pivotal movement of handle 16 in either direction about the longitudinal axis of cross piece 13, the arrangement being such that rod 111 and springs 115 brace and yieldingly hold handle 16 at the desired angle and absorb the vibrations caused by operation of the motor.

A cap 118 (see Figure 6) may be placed over each end of the reel shaft 75 and fixed to the circular plates 19 and 37 by means of screws 119.

The flange 20 of plate 19 and a similar flange with which plate 37 is provided fit over the adjacent rims of the respective wheels 38 and 45, as shown in Fig. 3, and act as a guard to prevent the entrance of dust, grass and the like between the wheels and plates at this point.

A lever 120 may be pivotally mounted at the upper end of handle 16 for controlling the throttle valve of the engine through a suitable wire connection 121 encased in a flexible tube 122.

The mechanism for connecting and disconnecting the traction wheels and cutting reel to and from the motor may be enclosed by a cover plate 133 extending across the frame members 11 and 26 and secured thereto by screws 134 threaded into tapped openings 135 in the frame members.

One embodiment of the invention has been shown and described for the purpose of illustration, but of course various changes may be made, such as in the size, shape and arrangement of the parts without departing from the spirit of the invention or the scope of the claims.

The invention claimed is:

1. In a power mower including a frame and supporting traction means, a cutting element supported by said frame, and a motor mounted on said frame, a drive shaft connected to said motor, means including a driven shaft and clutch thereon for providing a driving connection between said drive shaft and said traction means, means providing a driving connection between said cutting element and said drive shaft and including a second clutch carried by said drive shaft, and means for controlling said clutches independently of each other.

2. In a power mower including a frame and supporting traction means, a cutting element supported by said frame, and a motor mounted on said frame, a drive shaft connected to said motor, a driven shaft for operating said traction means, means providing a driving connection between said shafts and including a clutch carried by said driven shaft, means providing a driving connection between said cutting element and said drive shaft and including a second clutch carried by said drive shaft, and means for controlling said clutches independently of each other.

3. In a power mower, the combination of a frame having a motor, supporting traction means and a cutting element thereon, clutches for connecting and disconnecting the supporting traction means and the cutting element to and from the driving motor, members for actuating said clutches, and a pin fixed in said frame, said pin being common to said members and supporting the same for pivotal movement into and out of their respective clutch engaging and disengaging positions.

4. In a power mower of the character described including a frame, an operating clutch carried thereby, a spring acting to apply said clutch, and manually-operable means for releasing said clutch and for permitting of application of the same by said spring, means providing an operating connection between said clutch and said manually-operable means and having a dead-center position which is passed in one direction when said manually-operable means is in clutch-releasing position and which is passed in the opposite direction when said manually-operable means is in clutch-applying position, said spring coacting with said connecting means to hold the same on either side of its dead-center position, said connecting means including a member supported for pivotal movement, means providing a stop for said member when said connecting means has passed its dead-center position in said first-named direction, a rod connecting said member and clutch, and a second rod connecting said member and said manually-operable means.

5. In a power mower, a frame, traction means, a cutter and a motor on the frame, a power shaft operatively connected with the motor to be driven thereby, driving connections between the power shaft and the traction means cutter, clutches for rendering said connections operative or inoperative, and means for operating said clutches, one of said clutches being associated with the power shaft and the other with said driving connections, actuators for said clutches, and a common support for said actuators.

6. In a power mower, a frame, traction means therefor, a motor, a driving connection between said motor and traction means including a spring actuated clutch, a hand-operated toggle joint for operating said clutch, said joint when extended disengaging the clutch and when broken permitting it to be engaged by its spring, and a stop to limit the breaking of said joint in one direction prior to engagement of the clutch whereby the spring of the clutch may be utilized for holding the latter in either its engaged or disengaged position.

7. In clutch structure, a shaft, bearings therefor permitting of longitudinal shifting thereof, abutments fixed on said shaft adjacent said bearings, clutch members fixed and loose respectively on said shaft intermediate said abutments, a collar loose on said shaft adjacent one of said abutments, a spring interposed between said collar and one of said clutch members and normally tending to move the latter into operative engagement with the other clutch member, said spring acting to shift said shaft longitudinally in one direction when said clutch members are engaged to bring the pressure of said collar against the abutment adjacent thereto and to shift said shaft longitudinally in the opposite direction when said clutch members are disengaged to bring said pressure against the end of one of said bearings.

8. In clutch structure, a shaft, a clutch member fixed thereon, a second clutch member loosely mounted thereon and movable into and out of engagement with the first, an abutment fixed on the shaft, a collar loose on the shaft adjacent the abutment, a spring interposed between the collar and movable clutch member and normally tending to engage the latter with the fixed clutch member, means for moving said movable clutch member out of engagement with the fixed member against the action of the spring, a second abutment adjacent said collar and fixed independently of the shaft, said shaft being shiftable longitudinally under the action of said spring so as to bring the pressure of the collar against one of said abutments in one position of the clutch members and against the other abutment in the other position of said members.

9. In clutch structure, a shaft, a clutch member fixed thereon, a second clutch member member loosely mounted thereon and movable into and out of engagement with the first, an abutment fixed on the shaft, a collar loose on the shaft adjacent the abutment, a spring interposed between the collar and movable clutch member and normally tending to engage the latter with the fixed clutch member, means for moving said movable clutch member out of engagement with the fixed member against the action of the spring, a second abutment adjacent said collar and fixed independently of the shaft, said shaft being shiftable longitudinally under the action of said spring so as to bring the pressure of the collar against one of said abutments in one position of the clutch members and against the other abutment in the other position of said members, said second abutment constituting one of the bearings for said shaft.

10. In clutch structure, a shaft, a clutch member fixed thereon, a second clutch member loosely mounted thereon and movable into and out of engagement with the first, a collar loose on the shaft, a spring interposed between the collar and movable clutch member and normally tending to engage the latter with the fixed clutch member, means for moving said movable clutch member out of engagement with the fixed member against the action of the spring, and a plurality of abutments adjacent said collar, one fixed to the shaft and the other fixed independently of the shaft, said shaft being shiftable longitudinally under the action of said spring so as to bring the pressure of the collar against one of said abutments in one position of the clutch members and against the other abutment in the other position of said members.

11. In a power mower, the combination of a frame having a motor and a cutting element secured thereto, a drive shaft connected to said motor to be driven thereby, a clutch including a member fixed to said shaft and a member loosely mounted on said shaft for releasably connecting the cutting element to the shaft, a spring in abutting relation with said loosely mounted member for normally causing the same to engage the fixed member of the clutch and means on the shaft and frame for causing the force of the spring to be transmitted through the shaft when the clutch members are engaged and rotating and through the frame when the loosely mounted member has come to rest.

12. A transmission system for a power lawn mower including a shaft mounted on the frame of the mower and adapted to be driven by a motor on the lawn mower, clutch members on the shaft, a spring for urging said members into engaging position, a clutch operating device for disengaging said members against the action of the spring, means loosely mounted on the shaft for engaging one end of said spring and abutments on the shaft and frame for cooperating with said means and said clutch operating device to shift the pressure of the spring from the frame to the shaft as the clutch members are thrown into engaging position by the clutch operating device and for shifting the pressure of the spring from the shaft to the frame as the clutch members are thrown into disengaging position.

13. In a power mower, a shaft having a fixed clutch member and a loosely mounted clutch member thereon, a spring in abutting relation with the loosely mounted member for biasing said member in one direction, a clutch operating device for moving the loosely mounted member in the other direction and means for holding the spring in position and for transmitting the force thereof to the shaft when the clutch members are in engaging position and for cooperating with said clutch operating device to prevent the force of the spring from being transmitted through the shaft when the shaft is rotating and the loosely mounted member has come to rest.

14. A power transmission system adapted for use with the prime mover, cutting element and traction means of a power driven lawn mower including a pair of shafts and clutch mechanism on each shaft, each of said clutch mechanisms including a driven member, a complementary member for engaging said driven member, a spring for biasing said members into clutch engaging position, operating means for moving the members to disengaging position against the action of the spring and means for preventing the thrust of the spring being transmitted through relatively movable parts when the clutch members are in either engaged or disengaged positions.

15. In a power driven lawn mower having a motor and a cutting element adapted to be driven thereby, the combination of a transmission casing, a motor driven gear therein, a shaft journaled in the casing adapted to be connected to the cutting element, a gear wheel loosely mounted on the shaft and in mesh with said motor driven gear, clutching means for engaging the gear wheel for clutching the same to the shaft to thereby connect the cutting element to the motor through the gear, gear wheel and shaft, a spring on the shaft for coacting with said clutching means to normally bias the same to engaging position with the gear wheel, and abutments on the shaft for preventing the force of the spring from exerting a thrust upon the casing when the clutching means is in engagement with the gear wheel.

16. In a power driven lawn mower having a motor and a cutting element adapted to be driven thereby, the combination of a transmission casing a motor driven gear therein, a shaft journaled in the casing, adapted to be connected to the cutting element, a gear wheel loosely mounted on the shaft and in mesh with said motor driven gear, and clutching means for engaging the gear wheel for clutching the same to the shaft to thereby connect the cutting element to the motor through the gear, gear wheel and shaft.

17. A power driven lawn mower comprising a motor, a cutting element, traction means, driving connections between the motor and the cutting element and the traction means, and a casing enclosing the driving connections, the driving connection between the motor and the traction means including a shaft mounted on the casing, a pair of clutch members mounted on the shaft, means on the shaft abutting one of the clutch members but spaced from the adjacent portion of the casing, a spring urging said clutch members into engagement, and means on the shaft affording an abutment for said spring whereby the casing is relieved of the thrust of the clutch controlled drive for the traction means.

In witness whereof, I hereto affix my signature.

JOHN A. E. CARLSON.